United States Patent [19]

Vermeulen et al.

[11] Patent Number: 5,213,648
[45] Date of Patent: May 25, 1993

[54] METHOD OF PRODUCING A TAMPER-PROOF LAMINATE AND PRODUCT OBTAINED THEREBY

[75] Inventors: Leon L. Vermeulen, Herenthout; Robert S. Pauwels, Brasschaat, both of Belgium

[73] Assignee: AGFA-GEVAERT N.V., Mortsel, Belgium

[21] Appl. No.: 670,019

[22] Filed: Mar. 15, 1991

[30] Foreign Application Priority Data

Mar. 23, 1990 [EP] European Pat. Off. ......... 90200693.1

[51] Int. Cl.$^5$ ................................................ C09J 5/02
[52] U.S. Cl. ................................ 156/307.5; 40/626; 40/630; 156/310; 156/331.1; 428/916; 430/12; 430/14; 430/18; 524/607; 524/608; 524/612
[58] Field of Search ............... 156/307.5, 331.1, 310; 428/916; 40/626, 630; 430/12, 18, 14; 524/607, 612, 608

[56] References Cited

U.S. PATENT DOCUMENTS 3,520,758  7/1970  Wiest ..................................... 430/14
4,054,542  10/1977  Buckman et al. ................. 156/330.9
4,563,376  1/1986  Hammer et al. .................... 426/105

*Primary Examiner*—John J. Gallagher
*Attorney, Agent, or Firm*—William J. Daniel

[57] ABSTRACT

In a laminated product wherein at least one supported information-containing hydrophilic colloid layer is adhesively bonded on at least one of its surfaces to a protective hydrophobic resin sheet, improved adherence is achieved by using as the bonding adhesive a cationic crosslinked polymer obtained by:

a) condensing a polyalkylenepolyamine containing at least two primary amino groups and at least one secondary or tertiary amino group with a dicarboxylic acid to form a polyamidoamine, b) subjecting the resultant polyamidoamine to a graft reaction in the presence of an acid catalyst with an alkene-1,2-imine, and c) crosslinking the resultant graft polymer with an epihalohydrin, an Alpha-Omega dihalohydrin ether or the ether compound obtained by reaction of epichlorohydrin with a water-soluble polyalkyleneoxide to form the water-soluble cationic polymer. With this adhesive bond, a tamper-proof seal can be obtained between the information-containing colloid layer and the hydrophobic resin protective sheet.

18 Claims, No Drawings

METHOD OF PRODUCING A TAMPER-PROOF LAMINATE AND PRODUCT OBTAINED THEREBY

FIELD OF THE INVENTION

The present invention relates to a process for the manufacture of a laminated product, more particularly a tamperproof identification document (I.D. card).

BACKGROUND OF THE INVENTION

Identification documents essentially comprise a card or sheet material containing information relating to the bearer. Generally, a portion of the information is in the form of a photograph. Identification cards (I.D. cards) are used e.g. to establish a person's authorization to conduct certain activities (driver's license) or the authorization to have access to certain areas (employee I.D. cards) or to engage in credit transactions (I.D. credit cards).

In view of the widespread use of I.D. cards, especially in commercial transactions, such as cashing checks, credit purchases, etc., it is important that the information contained in the I.D. card cannot be altered and that the I.D. card gives maximum protection against counterfeiting by alteration and/or replacement of its data and photograph.

Normally the information in the I.D. card is protected by lamination between plastic sheets serving as support and covering sheet.

Many attempts have been made to obtain a seal that is sufficiently strong that it resists separation, e.g. by razor blade and/or wet treatment. The use of a pouch structure wherein only the border parts of the plastic sheets are sealed is not sufficiently tamperproof since after cutting around the edge of the original card the pouch can be opened and some information such as the photograph can be removed and replaced by other information before resealing the pouch.

Ideally, to avoid said shortcoming a "security seal" is established between the information-bearing element of the card or document and the plastic. As described in U.S. Pat. No. 4,151,666 the security seal insures that if one should succeed in the removal of the plastic cover sheet, a substantial portion of the information containing part of the document is also be removed so that a damaged part remains adhering to the support. In this way protection against surreptitious substitution of information is obtained discouraging alteration of sealed documents.

Since in most cases a photograph is used that is formed in one or more hydrophilic colloid layers as are known from silver halide photography, a good bonding of said layer(s) to the plastic support sheet and plastic covering sheet is essential so that any attempted opening of the seal results in obvious damage of the photograph and other information.

According to the U.S. Pat. No. 4,456,667 a tamperproof document consists of a photographic material as information carrier which is laminated on one or both sides with a transparent resin foil. In the lamination between the hydrophilic surface of a developed gelatin-silver halide emulsion layer and said transparent foil a layer of adhesive containing a poly-1,2-alkyleneimine is applied.

It has been established experimentally by us that poly-1,2-ehtyleneimine offers poor adhesion when used in the lamination of hydrophobic resin foils such as polyethylene foils to hydrophilic colloid layers containing a cationic mordant.

SUMMARY OF THE INVENTION

It is an object of the present invention to provide a process for the production of a laminated document such as an identification card wherein hydrophilic colloid layer containing information is sealed and bonded firmly at moderate laminating temperature and pressure to a hydrophobic covering layer or sheet.

It is more particularly an object of the present invention to provide a process for the production of a laminated document such as an identification card wherein a hydrophilic colloid layer containing on a support a cationic mordant for anionic dyes is sealed and bonded firmly by relatively short pressure contact and under moderate heating with a hydrophobic covering resin layer or sheet without applying particular high pressure.

Another object of the present invention is to provide a laminated product, e.g. laminated identification card, including a hydrophilic colloid layer wherein said layer is adhered strongly by an adhesive coating applied from aqueous medium to a hydrophobic resin layer or foil.

Other objects and advantages of the present invention will appear from the further description.

In accordance with the present invention a process for the production of a laminated document is provided wherein a supported hydrophilic colloid layer or assemblage of hydrophilic colloid layers containing a photograph and/or other information is bonded by lamination to a hydrophobic resin protective sheet, e.g. web or foil, said process comprising the following steps:

(1) coating a supported hydrophilic colloid layer with an aqueous solution containing the polyamidoamine condensation product of a polyalkylenepolyamine having at least two primary amino groups and at least one secondary or tertiary amino group with a dicarboxylic acid which condensation product has been grafted by reaction with an alkene-1,2-imine in the presence of an acid catalyst, and has been transformed into a cationic crosslinked polymer by reacting the obtained grafted polymer with a bifunctional crosslinking agent being an epihalohydrin or an Alpha-Omega-dihalohydrinether or the ether compound obtained by reaction of epichlorohydrin with a watersoluble polyalkyleneoxide, (2) drying the coated material, and (3) joining the thus coated hydrophilic colloid layer with a hydrophobic resin sheet, and applying heat and pressure to cause the hydrophobic resin sheet to be bonded to said hydrophilic colloid layer through the intermediary of said cationic crosslinked polymer.

Further in accordance with the present invention a laminated product, e.g. laminated document including identification information, is provided wherein a hydrophilic colloid layer is adhered by an adhesive coating to a hydrophobic resin sheet, characterized in that said adhesive coating contains the condensation product of a polyalkylenepolyamine containing at least two primary amino groups and at least one secondary or tertiary amino group with a dicarboxylic acid which condensation product being a polyamidoamine has been grafted by reaction with an alkene-1,2-imine in the presence of an acid catalyst, and has been transformed into a cationic crosslinked polymer by allowing to react the obtained grafted polymer with a bifunctional crosslinking agent being an epihalohydrin or an Alpha-Omegadihalohydrinether or the ether compound obtained by reaction of epichlorohydrin with a watersoluble polyalkyleneoxide.

DETAILED DESCRIPTION OF THE INVENTION

The preparation of the above defined cationic crosslinked polymer is described in published French patent application 2 020 415 and published German patent application (DE-OS) 3 316 179, wherein said polymer is described for use in the preparation of paper as flocculation agent and retention agent for pigments.

In the preparation of said polyamidoamine compounds used as starting compounds in the synthesis of said cationic crosslinked polymer preferably dicarboxylic acids containing 4 to 10 carbon atoms are made to react with polyalkylenepolyamines that contain 3 to 10 basic nitrogen atoms in their molecule and at least two primary amino groups.

Examples of suitable dicarboxylic acids for producing said polyamideamines are saturated aliphatic $C_4$–$C_{10}$-dicarboxylic acids including their anhydrides and esters capable of reaction with primary amines.

Preferred acids for use in the production of said polyamideamines are succinic acid, maleic acid, adipic acid, (hexanedioic acid), glutaric acid, diglycollic acid and sebacic acid or their functional derivatives, such as anhydrides or esters.

Examples of suitable polyalkylenepolyamines are diethylenetriamine, triethylenetetramine, tetraethylenepentamine, dipropylenetriamine, tripropylenetetramin and dihexamethylenetriamine.

In the preparation of said polyamidoamine compounds per mole of dicarboxylic acid or derivative 0.8 to 1.4 mole of polyalkylenepolyamine are used preferably.

The polyamidoamines obtain already a cationic character in the graft reaction with ethyleneimine in the presence of an acid catalyst, e.g. sulphuric acid or p-tolusulphonic acid. In the graft reaction preferably 20 to 400 parts by weight, more preferably 50 to 300 parts by weight, of ethene-1,2-imine (i.e. ethyleneimine) with respect to 100 parts by weight of the polyamidoamine are used.

Examples of epihalohydrins and Alpha-dihalohydrins serving as difunctional crosslinking agents for application in the preparation of said cationic crosslinked polymer are epibromohydrin, Alpha-dibromohydrin, epichlorohydrin and Alpha-dichlorohydrin.

Other useful difunctional crosslinking agents are the ether compounds obtained by reaction of epichlorohydrin with watersoluble polyalkyleneoxides. Examples thereof are the addition products of ethylenoxide and glycol or water, wherein e.g. per mole of glycol 8 to 100 mole of ethyleneoxide are used in the addition reaction. The still watersoluble polyalkyleneoxides are then with their OH-end groups allowed to react with equivalent amounts of epichlorohydrin so that hereby Alpha, Omega-dichlorohydrin ether compounds serving as bifunctional crosslinking agents are formed.

A preferred cationic crosslinked polymer for use according to the present invention, called hereinafter "cationic crosslinked polymer P", is the reaction product obtained according to Example 1 of published French patent application 2,020,415. In the preparation of said polymer first a polyamidoamine has been formed by reaction of diethylenetriamine and adipic acid. The obtained polyamidoamine has been grafted with ethyleneimine in the presence of p-tolusulfonic acid. Thereupon the grafted polymer has been crosslinked with epichlorohydrine to obtain a watersoluble cationic crosslinked polymer. A 15% by weight aqueous solution of the obtained polymer has a viscosity of 160 cP at 25° C.

With the above defined cationic crosslinked polymer particularly strong adhesion between a hydrophobic resin foil such as a polyethylene foil and a hydrophilic colloid layer containing a diffusion resistant cationic mordant can be obtained.

Cationic polymeric mordants are used in the production of dye images obtained by a dye diffusion transfer process. Known dye diffusion transfer processes are based on the image-wise transfer of diffusible dye molecules from an image-wise exposed silver halide emulsion material into a waterpermeable image receiving layer containing a mordant for the dye(s). The image-wise diffusion of the dyes is controlled by the development of one or more image-wise exposed silver halide emulsion layers, that for the production of a multicolour image are differently spectrally sensitized and contain respectively a yellow, magenta and cyan dye molecules. A survey of dye diffusion transfer processes is given by Christian C. Van de Sande in Angew. Chem.—Ed. Engl. 22 (1983), No. 3, pages 191-209.

For use in dye diffusion transfer photography the type of mordant chosen will depend upon the dye to be mordanted. If acid dyes are to be mordanted, the image-receiving layer contains basic mordants such as polymers of amino-guanidine derivatives of vinyl methyl ketone such as described in U.S. Pat. No. 2,882,156 or other basic polymeric mordants such as poly-4-vinylpyridine.

Particularly suitable mordants for anionic dyes are long-chain quaternary ammonium or phosphonium compounds or ternary sulphonium compounds, e.g. those described in U.S. Pat. Nos. 3,271,147 and 3,271,148, such as cetyltrimethyl-ammonium bromide, and polymeric cationic mordants.

In U.S. Pat. No. 4,186,014 cationic polymeric mordants are described that are particularly suited for fixing anionic dyes such as sulphinic acid salt dyes that are image-wise released by a redox-reaction described e.g. in published EP-A 0,004,399 and U.S. Pat. No. 4,232,107. Said cationic polymeric mordants contain glycidyl groups that can react with active hydrogen atoms present in gelatin serving as binding agent. Such polymers can be made by quaternizing a basic polyurethane, polyurea or polyurea-polyurethane with a quaternizing agent capable of introducing glycidly groups. According to said US-P specification the mordant layer acting as dye-image receiving layer contains preferably said cationic polymeric mordant in quantities of from 10 to 70% by weight based on the total solids content of the mordant layer.

Other particularly suitable cationic polymeric mordants are polyvinylimidazole compounds wherein at least part of the imidazole nuclei is in salt and/or quaternized form. A general formula of said polymeric mordants and a specific Example thereof (identified as Beizmittel B) are described in Research Disclosure August 1982, item 22040.

The coating of the hydrophilic colloid layer as defined in step (1) with an aqueous composition containing said cationic crosslinked polymer proceeds preferably at a dry solids coverage in the range of 0.2 g/m$^2$ to 5 g/m$^2$.

The coating proceeds by common coating apparatus known in the art, e.g. by dipping, spraying, doctor blade coating, roller coating, meniscus coating and the like. Dip-coating for double-side coating proceeds advantageously by roller transport through a coating liquid filled tray of a silver complex diffusion transfer apparatus.

The coating takes place preferably at room temperature (20° C.) with the treating liquid having a pH in the range of 4 to 10, whereupon the coated layer is dried to remove the water.

To laminate the foil covered with the adhesive layer it is advantageously to bring the covered layer continuously together with the hydrophobic resin material run in web form from a supply roll and to press them together in a roll laminator between rollers at a temperature of about 80° to 140° C. under a moderate pressure e.g. in the range of 0.5 to 1.5 kg/cm², keeping the elements to be laminated in pressure contact for a period of about 10 seconds, which corresponds in practice with a lamination rate of 1 m per minute.

Suitable roll-laminators for continuous heat-laminating are described e.g. in published UK patent applications 2 094 709 and 2 094 711.

During the coating and lamination the cationic cross-linked polymer penetrates into the hydrophilic colloid layer(s) containing the information to be protected and makes a very firm bond therewith and gives on drying the adhesive layer the surface a good adherence towards a hydrophobic resin surface such as polyethylene resin surface.

The process of laminating, may be carried out at one or both sides of the information carrier.

According to a particular embodiment two outermost hydrophobic resin elements used as protective covering parts at both sides of the information carrier are somewhat larger in size than the field of information on the information carrier. Operating that way and using hydrophobic protective resin elements of which the melting point is below the lamination temperature the field of information is surrounded at the edges by a rim of protective hydrophobic resin elements being homogeneously fused together. The parts containing the information may subsequently be punched out of the resulting laminate to form an identification card.

According to a preferred embodiment at least one of the hydrophilic colloid layers contained in the laminate is an imagewise exposed and processed (developed and fixed) silver halide emulsion layer or is an image-receiving layer containing a photographic image obtained by the silver complex diffusion transfer reversal process or is an image-receiving layer containing a cationic mordant for anionic dyes set free in a dye diffusion transfer process based on silver halide photography.

The composition of silver complex diffusion transfer (DTR-) reversal materials and processing are known e.g. from the book: "Photographic Silver Halide Diffusion Processes" by André Rott and Edith Weyde—Focal Press—London—New York (1972).

A survey of dye diffusion transfer materials is given e.g. in Research Disclosure, November 1976, item 15162.

In a silver halide emulsion layer or an image-receiving layer for silver complex or dye diffusion transfer processing gelatin is used preferably as hydrophilic colloid binder. Gelatin can, however, be replaced in part or integrally by synthetic, semi-synthetic, or natural polymers. Synthetic substitutes for gelatin are e.g. polyvinyl alcohol, poly-N-vinyl pyrrolidone, polyvinyl imidazole, polyvinyl pyrazole, polyacrylamide, polyacrylic acid, and derivatives thereof, in particular copolymers thereof. Natural substitutes for gelatin are e.g. other proteins such as zein, albumin and casein, cellulose, saccharides, starch, and alginates. In general, the semi-synthetic substitutes for gelatin are modified natural products e.g. gelatin derivatives obtained by conversion of gelatin with alkylating or acylating agents or by grafting of polymerizable monomers on gelatin, and cellulose derivatives such as hydroxyalkyl cellulose, carboxymethyl cellulose, phthaloyl cellulose, and cellulose sulphates.

In DTR-image-receiving materials preferably gelatin is used as sole binding agent for its physical development nuclei or in combination with alginic acid derivatives, polyvinyl alcohol, starch and starch derivatives, particularly carboxymethylcellulose or gallactomannans (ref. the above mentioned book of André Rott and Edith Weyde, p. 49). Other organic binding agents of the synthetic type are e.g. poly-N-vinylpyrrolidinone, copolymers of polyvinyl ester and maleic anhydride. As inorganic binding agent colloidal silica has been mentioned, e.g. in U.S. Pat. No. 2,698,237.

In dye diffusion transfer layers suited for use in the production of a laminated document according to the present invention a hydrophilic colloid binder, preferably gelatin, is used in conjunction with a polymeric mordant for the transferred dyes as mentioned already hereinbefore.

A particularly suited cationic polymeric mordant, called hereinafter "mordant M" has the following composition:

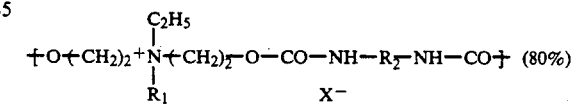

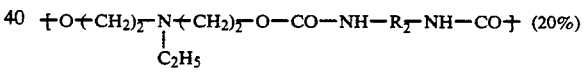

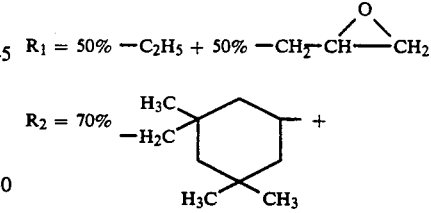

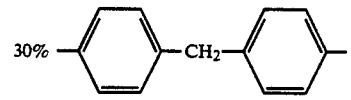

$X^- = 50\% \; C_2H_5SO_4^- + 50\% \; Cl^-$

As described in published European patent application 0 309 618 a particularly suited dye image receiving layer for use in the production of laminates contains a hydrophobic resin support coated with a subbing layer that is coated with an image-receiving layer containing gelatin in combination with a cationic polymeric mordant containing glycidyl groups that can react with active hydrogen atoms of gelatin, wherein the weight ratio of said polymeric mordant to gelatin in said image-receiving layer is between 25:1 to 1:1 and the gelatin is present therein at a coverage of at least 0.1 g per m². Said subbing layer has been applied from an aqueous composition comprising a polyester-polyurethane wherein isocyanate groups still present in its structure have reacted with an ionomeric compound containing at least one active hydrogen atom and a carboxylate or sulphonate salt group forming an anionic polyester-polyurethane.

The preparation of said anionic polyester-polyurethanes is described in U.S. Pat. Nos. 3,397,989 and 4,388,403.

The quantity of salt groups in said anionic polymers is sufficient to make the anionic polyester-polyurethane dispersable in aqueous medium or in aqueous medium optionally mixed with a water-miscible solvent.

Preferably the sulfonate and/or carboxylate groups total from 0.5 to 15% by weight with respect to the anionic polyester-polyurethane.

The polyester-polyurethane used as starting compound in the reaction with said ionomeric compound is preferably a polyurethane of an essentially linear polyester compound that has two terminal hydroxyl groups, the polyester having preferably a molecular weight of about 300 to about 20,000.

Preferred anionic polyester-polyurethanes for use as subbing materials in the production of a laminated product according to the present invention contain linear polyester structural parts corresponding with a polyester derived from a dicarboxylic acid containing up to 6 carbon atoms and a polyhydric aliphatic alcohol containing up to 6 carbon atoms.

In said subbing layer gelatin may be present in the range of 0% to 25% by weight with respect to the anionic polyester-polyurethane.

An anionic polyester-polyurethane that is particularly suited for use in a subbing layer on a polyvinyl chloride resin support, either or not in combination with gelatin, is called herein "Subbing ingredient S" and is the reaction product of:

(1) the polyester of adipic acid and hexanediol with average molecular weight 840, (23%),
(2) 4,4'-diisocyanato-dicyclohexylmethane (14%),
(3) dimethylolpropionic acid (2%),
(4) trimethylamine (1.5%), the given percentages are by weight.

Subbing ingredient S is used as a dispersion in water containing 7.5% by weight of N-methylpyrrolidinone.

The subbing layer composition preferably also contains a siloxane compound. Preferred siloxane compounds for use according to the present invention are within the scope of the following general formula:

$$R^{11}-Si{\overset{O-R^{12}}{\underset{O-R^{14}}{-O-R^{13}}}}$$

wherein:
$R^{11}$ represents a chemical group capable of a polymerization reaction or reactive with respect to amino and/or hydroxyl groups present in proteinaceous material such as gelatin and caseine, more particularly is a group containing reactive halogen such as a reactive chlorine atom, an epoxy group or an alpha,beta-ethylenically unsaturated group, representatives of such groups being e.g. the following:

Cl—CH₂—CO—NH—L—
Br—CH₂—CO—NH—L—

[triazine ring with Cl substituents and —NH—L—]

CH₂=CH—SO₂—CH₂—O—CH₂—SO₂—CH₂—NH—L—

$$CH_2=C\underset{CH_3}{\overset{}{-}}C\overset{O}{\underset{}{-}}-O-L-$$

$$CH_2=CH-\overset{O}{\underset{}{C}}-NH-L-$$

$$CH_2=C\underset{CH_3}{\overset{}{-}}\overset{O}{\underset{}{C}}-NH-L-$$

wherein
L represents an alkylene group preferably a $C_1$-$C_4$ alkylene group,
or
$R^{11}$ represents the group:

$$H_2C\overset{O}{\overbrace{\phantom{xxx}}}CH-Z-$$

wherein
Z is a bivalent hydrocarbon chain including such chain interrupted by oxygen, e.g. is a —CH₂—O(CH₂)₃— group, or a bivalent hydrocarbon group that is linked at the side of the silicon atom to oxygen, e.g. is a —CH₂—O— group, and each of
$R^{12}$, $R^{13}$ and $R^{14}$ (same or different) represents a hydrocarbon group including a substituted hydrocarbon group e.g. methyl and ethyl.

Siloxane compounds according to the above general formula are described in U.S. Pat. No. 3,661,584 and GB-P 1,286,467 as compounds improving the adherence of proteinaceous colloid compositions to glass.

Examples of particularly useful siloxane compounds are listed in the following table 1.

TABLE 1

1.  Cl—CH₂—CO—NH—(CH₂)₃—Si(OC₂H₅)₃

TABLE 1-continued

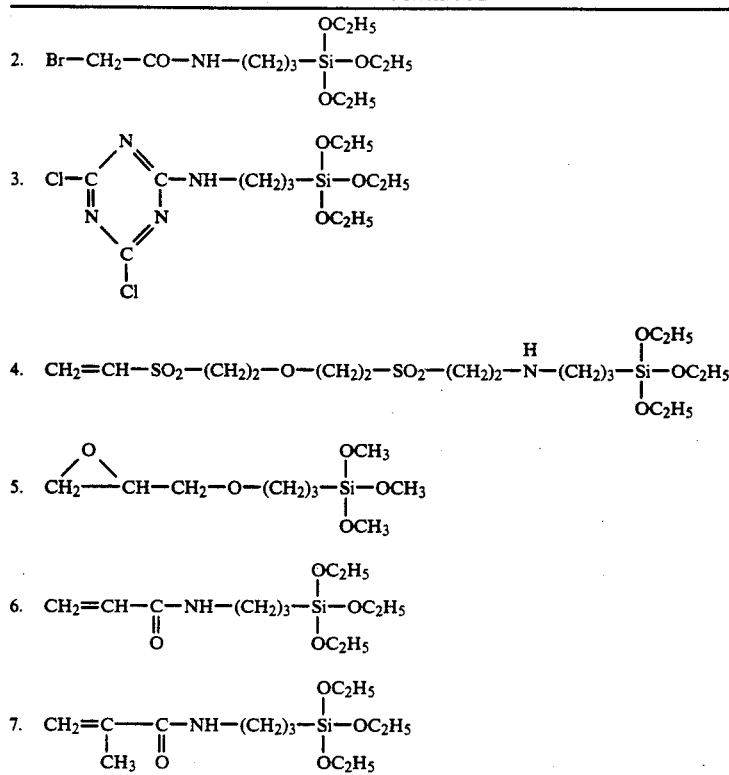

The siloxane compounds are preferably used in a ratio by weight with respect to the anionic polyester-polyurethane in the range of 0:1 to 0.15:1.

Hydrophobic resin supports whereto said subbing layer provides a good anchorage for a mordant layer as defined above are made of e.g. polyester resin, polycarbonates of bis-phenols, polyolefins, e.g. polyethylene and polypropylene, polystyrene or a vinyl chloride polymer. The latter polymer is particularly suited for forming laminates by heat-sealing.

The dye image receiving layer may contain ultraviolet-absorbing substances to protect the mordanted dye images from fading.

For preventing discolouration of the dye image and staining of the image-background by the heat applied in the lamination step the hydrophilic colloid composition of the photographic laminate contains iodide ions, preferably applied in the form of potassium iodide, as described in published EP-A 0 250 657.

The production of colour photographs by the dye diffusion transfer process is a very convenient method especially for the production of identification cards containing a colour photograph of the person to be identified.

The image-receiving layer can form part of a separate image-receiving material or form an integral combination with the light-sensitive layer(s) of the photographic material.

When the image-receiving layer is applied to a common hydrophobic resin support and remains associated with the silver halide emulsion layer(s) after processing of the photosensitive material, an alkali-permeable light-shielding layer, e.g. containing white pigment particles, is applied between the image-receiving layer and the silver halide emulsion layer(s) to mask the negative image with respect to the positive image as described e.g. in the already mentioned book of André Rott and Edith Weyde, page 141.

In the production of a laminate according to the present invention any type of hydrophobic resin sheet support may be used.

A preferred support for use in heat sealing is made of a vinyl chloride polymer.

The term "vinyl chloride polymer" used herein includes the homopolymer, as well as any copolymer containing at least 50% by weight of vinyl chloride units and including no hydrophilic recurring units.

Vinyl chloride copolymers serving as the support may contain one or more of the following comonomers: vinylidene chloride, vinyl acetate, acrylonitrile, styrene, butadiene, chloroprene, dichlorobutadiene, vinyl fluoride, vinylidene fluoride and trifluorochloroethylene.

The polyvinyl chloride serving as the support may be chlorinated to contain 60–65% by weight of chlorine.

Many properties of polyvinyl chloride and its copolymers are improved by plasticization and their stability can be improved by stabilizers well known to those skilled in the art (see, e.g., F. W. Billmeyer, Textbook of Polymer Chemistry, Interscience Publishers, Inc., New York (1957) p. 311–315)).

The polyvinyl chloride support may contain pigments or dyes as colouring matter e.g. in an amount up to 5% by weight. An opaque white appearance may be obtained by incorporation of white pigments, e.g. titanium dioxide particles.

In order to reduce repellence on coating the hydrophilic coating composition of the hydrophilic colloid imaging layer(s) and in order to improve the coating speed the hydrophobic resin support such as vinyl chloride polymer support or a paper support coated with said polymer is pre-treated with a corona discharge by passing the support, e.g. in sheet or belt form, between a grounded conductive roller and corona wires whereto an alternating current (AC) voltage is applied with sufficiently high potential to cause ionization of the air. Preferably the applied peak voltage is in the range of 10 to 20 kV. An AC corona unit is preferred because it does not need the use of a costly rectifier unit and the voltage level can be easily adapted with a transformer. In corona-discharge treatment with an an AC corona unit a frequency range from 10 to 100 kHz is particularly useful. The corona treatment can be carried out with material in the form of a belt or band at a speed of 10 to 30 m per min while operating the corona unit with a current in the range of 0.4 to 0.6 A over a belt or band width of 25 cm.

The corona-discharge treatment makes it possible to dispense with a solvent treatment for attacking and roughening the surface of the resin support and is less expensive and more refined in its application.

The resin support sheet whereon the hydrophilic colloid layer(s) containing the information to be protected is (are) coated is according to a preferred embodiment a polyvinyl chloride support having a thickness of only 0.050 to 0.75 mm. A sheet of that thickness can still be manipulated easily in a mechanical printing process, e.g. offset or intaglio printing, and before or after being coated with the necessary hydrophilic colloid layer(s) for imaging purposes can receive itself or on said layer(s) security or verification marks in the form of e.g. a watermark, finger prints, printed patterns known from bank notes, coded information, e.g. binary code information, liquid crystals, signature or other printed personal data or marks that may be applied with fluorescent pigments, nacreous pigments giving special light-reflection effects, and/or visibly legible or ultraviolet-legible printing inks as described e.g. in GB-P 1,518,946 and U.S. Pat. No. 4,105,333.

Other possibilities to increase security against counterfeiting are the inclusion in the laminate of a fugitive ink pattern that becomes leached out or blurred by contact with moisture if one should succeed in opening the laminate by a wet treatment.

Further security features are infrared-absorbing markings, mildly radioactive isotope patterns, magnetic dots or strips and electronic microcircuits hidden from visibility, and holograms as described, e.g., in DE-OS 2 639 952, GB-P 1,502,460 and 1,572,442 and U.S. Pat. No. 3,668,795. The holographic patterns may be obtained in silver halide emulsion layers, normally Lippmann emulsions, especially designed for that purpose and can either or not be combined with a photograph.

According to an embodiment the silver halide emulsion layer for producing the hologram is applied to one side of the transparent cover sheet used in the manufacture of a laminate according to the present invention and laminated together with the image receiving layer either or not separated therefrom by a transparent resin intersheet made of polyethylene or a resin sheet such as a polyvinyl chloride sheet coated with polyethylene.

When the resin sheet used as support of the laminate has to possess a thickness as required for an identification card to be inserted in a slot of an electronic identification apparatus, several sheets of matted polyvinyl chloride are stacked and laminated so as to reach a final thickness of e.g. 0.075 to 1 mm. The laminar article contains in that case preferably in the polyvinyl chloride support sheet, opacifying titanium dioxide and a suitable plasticizing agent. The support may be provided with an embossed structure.

The hydrophobic resin cover sheet consists preferably of a resin having a lower glass transition temperature (Tg) and melting temperature (Tm) than the resin present in the support or carrier sheet. According to a preferred embodiment the cover sheet is a polyethylene sheet having e.g. a thickness in the range of 20 to 200 micron or is polyethylene terephthalate resin sheet coated with a resinous melt-adhesive layer, e.g. a polyalkylene layer, preferably polyethylene layer, having a glass transition temperature at least 40° C. lower than the glass transition temperature of the resin of the support sheet of the laminar article. In this connection reference is made to the Tg values of polyethylene, polypropylene, polyvinyl chloride and polyethylene terephthalate being −20° C., +5° C., +80° C. and +67° C. respectively (see J. Chem. Educ., Vol. 61, No. 8. August 1984, p. 668).

The following examples illustrate the present invention without, however, limiting it thereto.

All parts, ratios and percentages are by weight unless otherwise stated.

EXAMPLE 1

A DIN A4 sheet of polyvinyl chloride made opaque with titanium dioxide and having a width of 24 cm and a thickness of 200 μm was treated at both sides under the same circumstances with an electrical discharge produced by a corona discharge apparatus operated as follows:

film travelling speed: 20 m/min,
electrode spacing to sheet surface: 2 mm,
corona current: 0.55 A,
AC voltage difference (peak value): 10 kV,
frequency: 30 kHz.

The corona-treated sheet was coated at both sides with the following subbing coating composition expressed in g/m² for each side:

| | |
|---|---|
| Ingredient A | 2.0 |
| Ingredient B | 0.2 |
| The subbing layer was coated with a mordant layer composition expressed in g/m² for each side: | |
| Ingredient C | 2.25 |
| Ingredient D | 5.35 |

"Ingredient A" is the polyester-urethane "subbing ingredient 5" the composition of which has been defined hereinbefore.
Ingredient C is the "mordant M" as described hereinbefore.
Ingredients B and D are gelatin.

The aqueous coating composition of the subbing layer contained a common spreading agent and siloxane compound No. 6 in an amount of 6.25% with respect to ingredient A and was introduced as a 5% solution in ethanol.

The above image receiving sheet was dye diffusion image transfer processed at both sides with an information-wise photo-exposed photographic dye diffusion transfer material having a composition as described in the Example of U.S. Pat. No. 4,496,645. For that purpose following the photo-exposure each sheet of said photographic material was wetted in a first tray of a COPYPROOF CP 38 (trade name of Agfa-Gevaert N.V. Belgium) diffusion transfer processing apparatus with a basic processing liquid of the following composition:

| | |
|---|---|
| sodium hydroxide | 25 g |
| sodium orthophosphate | 25 g |
| cyclohexane dimethanol | 25 g |
| 2,2'-methylpropylpropane diol | 25 g |
| N-ethylbenzene-pyridinium chloride | 0.5 g |
| distilled water up to | 1000 ml |

After being wetted each sheet was contacted with a different side of the dye image receiving sheet material and kept in contact therewith for 1 minute, whereupon the sheets were separated.

After separation the dye image receiving sheet material was led through a second tray containing plain water as rinsing liquid.

Thereupon the thus treated dye image receiving sheet was double-side coated by dip-coating with an adhesive coating being applied from an aqueous 15% solution of cationic crosslinked polymer P defined hereinbefore. The dry coverage of said polymer P was 2 g/m² at each side.

After drying the thus coated sheet was laminated at each side with a transparent cover sheet being a 100 μm thick polyethylene terephthalate sheet coated at the lamination side with a thermoadhesive layer of polyethylene having a thickness of 100 μm. The lamination was carried out in a roll laminator pressing successive areas of the elements to be laminated together for 10 seconds using a pressure of 0.5 kg/cm² at a temperature of 110° C.

The obtained laminate has a sealing thus strong that even in wet state peeling apart of the cover sheet is no longer possible without destroying the dye image.

We claim:

1. A process for the production of a laminated document wherein a supported hydrophilic colloid layer or assemblage of hydrophilic colloid layers containing a photograph and/or other information is bonded by lamination of at least one of its surfaces to a hydrophobic resin sheet, said process comprising the following steps:
   (1) coating at least one surface of said supported hydrophilic colloid layer or said assemblage of hydrophilic colloid layers with an aqueous solution containing the polyamidoamine condensation product of a polyalkylenepolyamine containing at least two primary amino groups and at least one secondary or tertiary amino group with a dicarboxylic acid which condensation product has been further grafted by reaction with an alkene-1,2-imine in the presence of an acid catalyst, and has been transformed into a cationic crosslinked polymer by reacting the obtained grafted polymer with a bifunctional crosslinking agent selected from an epihalohydrin, an Alpha-Omega-dihalohydrinether or the ether compound obtained by reaction of epichlorohydrin with a watersoluble polyalkyleneoxide,
   (2) drying the coated product, and
   (3) joining the thus coated hydrophilic colloid layer or assemblage of hydrophilic colloid layers with a hydrophobic resin sheet, and applying heat and pressure to cause the hydrophobic resin sheet to be bonded to said hydrophilic colloid layer through the intermediary of said coating containing said cationic crosslinked polymer.

2. The process according to claim 1 wherein said polyamidoamine condensation product is made by reacting a dicarboxylic acid containing 4-10 carbons atoms with a polyalkylenepolyamine containing 3-10 basic nitrogen atoms and at least two primary amino groups.

3. A process according to claim 2, wherein said dicarboxylic acid is a saturated aliphatic $C_4$-$C_{10}$-dicarboxylic acid including their anhydrides and esters capable of reaction with primary amines.

4. A process according to claim 1, wherein said polyalkylenepolyamines are selected from the group consisting of diethylenetriamine, triethylenetetramine, tetraethylenepentamine, dipropylenetriamine, tripropylenetetramine and dihexamethylenetriamine.

5. A process according to claim 1, wherein the grafted polyamidoamine is crosslinked by reaction with an epihalohydrin or Alpha-dihalohydrins serving as difunctional crosslinking agent.

6. A process according to claim 1, wherein the difunctional crosslinking agent is an ether compound obtained by reaction of epichlorohydrin with a water-soluble polyalkyleneoxide.

7. A process according to claim 1, wherein said aqueous solution containing said cationic crosslinked polymer is single-side coated at a dry solids coverage in the range of 0.2 to 5 g/m².

8. A process according to claim 1, wherein in step (3) heat is applied at a temperature in the range of 80° to 140° C., and pressure is applied in the range of 0.5 to 1.5 kg/cm².

9. A process according to claim 1, wherein at least one of said hydrophilic colloid layers is an imagewise exposed, developed and fixed silver halide emulsion layer or is an image-receiving layer containing a photographic image obtained by the silver complex diffusion transfer reversal process or a dye diffusion transfer process based on silver halide photography.

10. A process according to claim 1, wherein each hydrophilic colloid layer or layers contains a cationic mordant.

11. A process according to claim 1, wherein said hydrophilic colloid layer or layers contain gelatin.

12. A process according to claim 1, wherein the support of said hydrophilic colloid layer or layers is a polyvinyl chloride support sheet and the hydrophobic resin element laminated to the outermost hydrophilic colloid layer through the intermediary of said adhesive coating is a polyethylene layer coated on a polypropylene or polyethylene terephthalate support.

13. The process according to claim 1 said polyamidoamine condensation product is prepared by reacting said dicarboxylic acid with said polyalkylenepolyamine at a molar ratio in the range of 1:0.8-1.4.

14. The process according to claim 1 wherein the graft reaction of said polyamidoamine is with ethyleneimine in the presence of said acid catalyst.

15. The precess according to claim 1 wherein the cationic crosslinked polymer is obtained by first reacting diethylenetriamine and adipic acid to form said polyamidoamine, then grafting said polyamidoamine in an acid medium with ethyleneimine, and finally crosslinking said grafted polymer with epichlorohydrin to form a water-soluble cationic polymer.

16. The method according to claim 1 wherein said hydrophilic colloid is supported on a sheet of a vinyl chloride polymer.

17. The process according to claim 1 wherein a protective hydrophobic resin sheet is bonded to both sides of the information-containing hydrophilic layer.

18. The process according to claim 17 wherein each such protective hydrophobic resin sheet is larger in size than the field of information on the information-containing layer and the melting point of such hydrophobic resin is below the bonding temperature so that the field of information is surrounded by a margin of protective hydrophobic resin sheets homogeneously fused together.

* * * * *